(12) United States Patent
Graff-Radford et al.

(10) Patent No.: US 9,215,578 B2
(45) Date of Patent: Dec. 15, 2015

(54) MONITORING SYSTEMS AND METHODS

(71) Applicant: OMNILINK SYSTEMS, INC., Alpharetta, GA (US)

(72) Inventors: Daniel Graff-Radford, Atlanta, GA (US); Yoganand Rajala, Suwanee, GA (US)

(73) Assignee: Omnilink Systems, Inc., Alpharetta, GA (US)

( * ) Notice: Subject to any disclaimer, the term of this patent is extended or adjusted under 35 U.S.C. 154(b) by 28 days.

(21) Appl. No.: 13/750,205

(22) Filed: Jan. 25, 2013

(65) Prior Publication Data
US 2013/0196613 A1 Aug. 1, 2013

Related U.S. Application Data

(60) Provisional application No. 61/591,439, filed on Jan. 27, 2012.

(51) Int. Cl.
*H04M 11/04* (2006.01)
*H04W 4/22* (2009.01)
*H04W 4/02* (2009.01)

(52) U.S. Cl.
CPC . *H04W 4/22* (2013.01); *H04W 4/02* (2013.01)

(58) Field of Classification Search
CPC .................................. H04W 4/02; H04W 4/22
USPC ........... 455/404.1, 404.2, 456.1, 456.5, 456.6
See application file for complete search history.

(56) References Cited

U.S. PATENT DOCUMENTS

| | | | |
|---|---|---|---|
| 4,359,733 A | 11/1982 | O'Neill | |
| 4,673,936 A | 6/1987 | Kotoh | |
| 4,736,196 A | 4/1988 | McMahon | |
| 4,747,120 A | 5/1988 | Foley | |
| 4,750,197 A | 6/1988 | Denekamp et al. | |
| 4,777,477 A | 10/1988 | Watson | |
| 4,812,823 A | 3/1989 | Dickerson | |

(Continued)

FOREIGN PATENT DOCUMENTS

| | | |
|---|---|---|
| DE | 19832671 | 1/2000 |
| EP | 0528090 | 2/1993 |

(Continued)

OTHER PUBLICATIONS

U.S. Appl. No. 11/806,841, filed Jun. 1, 2007, Taylor, Jr.

(Continued)

*Primary Examiner* — Barry Taylor
(74) *Attorney, Agent, or Firm* — King & Spalding LLP

(57) ABSTRACT

Methods for operating monitoring systems may comprise receiving, with a monitoring station, an alert from a base station, the alert not related to the location of the base station. The methods may also comprise receiving, with the monitoring station, a message comprising current location data for the base station. The current location data may be compared to pre-established location data. Based on the comparing, it may be determined whether the base station is located substantially at a pre-established location. One process associated with responding to the alert may be performed when the base station is located substantially at the pre-established location. An alternate process associated with responding to the alert may be performed when the base station is not located substantially at the pre-established location.

34 Claims, 3 Drawing Sheets

(56) References Cited

U.S. PATENT DOCUMENTS

| | | | |
|---|---|---|---|
| 4,885,571 | A | 12/1989 | Pauley |
| 4,918,425 | A | 4/1990 | Greenberg et al. |
| 4,918,432 | A | 4/1990 | Pauley et al. |
| 4,952,928 | A | 8/1990 | Carroll |
| 4,999,613 | A | 3/1991 | Williamson |
| 5,043,736 | A | 8/1991 | Darnell |
| 5,182,543 | A | 1/1993 | Siegel |
| 5,204,670 | A | 4/1993 | Stinton |
| 5,223,844 | A | 6/1993 | Mansell |
| 5,298,884 | A | 3/1994 | Gilmore |
| 5,365,516 | A | 11/1994 | Jandrell |
| 5,461,365 | A | 10/1995 | Schlager et al. |
| 5,461,390 | A | 10/1995 | Hoshen |
| 5,468,110 | A | 11/1995 | McDonald et al. |
| 5,471,197 | A | 11/1995 | McCurdy et al. |
| 5,493,694 | A | 2/1996 | Vlcek |
| 5,497,148 | A | 3/1996 | Oliva |
| 5,497,149 | A | 3/1996 | Fast |
| 5,504,474 | A | 4/1996 | Libman |
| 5,518,402 | A | 5/1996 | Tommarello |
| 5,523,740 | A | 6/1996 | Burgmann |
| 5,537,102 | A | 7/1996 | Pinnow |
| 5,552,772 | A | 9/1996 | Janky et al. |
| 5,559,520 | A | 9/1996 | Barzegar |
| 5,568,119 | A | 10/1996 | Schipper et al. |
| 5,593,267 | A | 1/1997 | McDonald et al. |
| 5,594,425 | A | 1/1997 | Ladner |
| 5,623,390 | A | 4/1997 | Noda et al. |
| 5,627,520 | A | 5/1997 | Grubbs |
| 5,646,632 | A | 7/1997 | Khan |
| 5,650,766 | A | 7/1997 | Burgmann |
| 5,650,770 | A | 7/1997 | Schlager et al. |
| 5,652,570 | A | 7/1997 | Lepkofkor |
| 5,712,619 | A | 1/1998 | Simkin |
| 5,714,931 | A | 2/1998 | Petite et al. |
| 5,731,757 | A | 3/1998 | Layson |
| 5,742,233 | A | 4/1998 | Hoffman et al. |
| 5,742,509 | A | 4/1998 | Goldberg et al. |
| 5,748,148 | A | 5/1998 | Heiser |
| 5,752,976 | A | 5/1998 | Duffin |
| 5,825,283 | A | 10/1998 | Camhi |
| 5,828,987 | A | 10/1998 | Tano et al. |
| 5,835,377 | A | 11/1998 | Bush |
| 5,835,907 | A | 11/1998 | Newman |
| 5,838,237 | A | 11/1998 | Revell et al. |
| 5,852,401 | A | 12/1998 | Kita |
| 5,857,433 | A | 1/1999 | Files |
| 5,867,103 | A | 2/1999 | Taylor |
| 5,870,029 | A | 2/1999 | Otto et al. |
| 5,890,061 | A | 3/1999 | Timm |
| 5,892,454 | A | 4/1999 | Schipper et al. |
| D410,206 | S | 5/1999 | Slater |
| 5,905,461 | A | 5/1999 | Neher |
| 5,940,004 | A | 8/1999 | Fulton |
| 5,948,038 | A | 9/1999 | Daley et al. |
| 5,959,533 | A | 9/1999 | Layson, Jr. |
| 5,982,281 | A | 11/1999 | Layson, Jr. |
| 5,990,793 | A | 11/1999 | Bieback |
| 6,011,510 | A | 1/2000 | Yee |
| 6,014,080 | A | 1/2000 | Layson, Jr. |
| 6,024,928 | A | 2/2000 | Foster |
| 6,054,928 | A | 4/2000 | Lemelson et al. |
| D424,463 | S | 5/2000 | Babers, Jr. |
| 6,072,396 | A | 6/2000 | Gaukel |
| 6,084,517 | A | 7/2000 | Rabanne |
| 6,084,547 | A | 7/2000 | Sanderford et al. |
| 6,100,806 | A | 8/2000 | Gaukel |
| 6,104,295 | A | 8/2000 | Tenarvitz et al. |
| 6,131,067 | A | 10/2000 | Girerd et al. |
| 6,150,921 | A | 11/2000 | Werb |
| 6,160,481 | A | 12/2000 | Taylor, Jr. |
| 6,181,253 | B1 | 1/2001 | Eschenbach et al. |
| 6,198,431 | B1 | 3/2001 | Gibson |
| D440,170 | S | 4/2001 | Conerly |
| 6,218,945 | B1 | 4/2001 | Taylor, Jr. |
| 6,232,880 | B1 | 5/2001 | Anderson et al. |
| 6,232,916 | B1 | 5/2001 | Grillo |
| 6,239,700 | B1 | 5/2001 | Hoffman et al. |
| 6,278,370 | B1 | 8/2001 | Underwood |
| 6,344,794 | B1 | 2/2002 | Ulrich et al. |
| 6,353,406 | B1 | 3/2002 | Lanzl |
| 6,356,841 | B1 | 3/2002 | Hamrick et al. |
| 6,392,565 | B1 | 5/2002 | Brown |
| 6,405,213 | B1 | 6/2002 | Layson, Jr. |
| 6,430,813 | B2 | 8/2002 | Muraguchi et al. |
| 6,431,455 | B1 | 8/2002 | Ponert |
| 6,438,380 | B1 | 8/2002 | Bi |
| 6,483,427 | B1 | 11/2002 | Werb |
| 6,486,801 | B1 | 11/2002 | Jones |
| 6,512,456 | B1 | 1/2003 | Taylor, Jr. |
| 6,581,546 | B1 | 6/2003 | Dalland |
| 6,606,556 | B2 | 8/2003 | Curatolo et al. |
| 6,624,750 | B1 | 9/2003 | Marman et al. |
| 6,639,516 | B1 | 10/2003 | Copley |
| 6,646,617 | B1 | 11/2003 | Gaukel |
| 6,674,368 | B2 | 1/2004 | Hawkins |
| 6,703,936 | B2 | 3/2004 | Hill et al. |
| 6,711,500 | B2 | 3/2004 | Cheng |
| 6,747,555 | B2 | 6/2004 | Fellenstein et al. |
| 6,774,797 | B2 | 8/2004 | Freathy et al. |
| 6,774,799 | B2 | 8/2004 | Defant |
| 6,801,853 | B2 | 10/2004 | Workman |
| 6,812,824 | B1 | 11/2004 | Goldinger |
| 6,838,998 | B1 | 1/2005 | Brown |
| 6,840,904 | B2 | 1/2005 | Goldberg |
| 6,862,454 | B1 | 3/2005 | Kanevsky |
| RE38,838 | E | 10/2005 | Taylor |
| 6,961,592 | B2 | 11/2005 | O'Connor |
| 6,972,684 | B2 | 12/2005 | Copley |
| 6,975,222 | B2 | 12/2005 | Krishan |
| 6,975,234 | B2 | 12/2005 | Boccacci |
| 6,992,582 | B2 | 1/2006 | Hill |
| 7,015,817 | B2 | 3/2006 | Copley |
| 7,034,678 | B2 | 4/2006 | Burkley et al. |
| 7,034,695 | B2 | 4/2006 | Troxler |
| D520,393 | S | 5/2006 | Darby |
| 7,038,590 | B2 | 5/2006 | Hoffman et al. |
| 7,064,670 | B2 | 6/2006 | Galperin |
| 7,079,034 | B2 | 7/2006 | Stilp |
| 7,098,795 | B2 | 8/2006 | Adamczyk et al. |
| 7,119,695 | B2 | 10/2006 | Defant |
| 7,123,141 | B2 | 10/2006 | Contestabile |
| D534,822 | S | 1/2007 | Wadda |
| D535,205 | S | 1/2007 | Frederick et al. |
| 7,209,757 | B2 | 4/2007 | Naghian et al. |
| 7,283,044 | B2 | 10/2007 | Bandy |
| 7,289,786 | B2 | 10/2007 | Krasner |
| RE39,909 | E | 11/2007 | Taylor, Jr. |
| 7,299,987 | B2 | 11/2007 | Yoo et al. |
| 7,382,268 | B2 | 6/2008 | Hartman |
| 7,492,254 | B2 | 2/2009 | Bandy et al. |
| 7,518,514 | B2 | 4/2009 | Bauchot et al. |
| 7,598,855 | B2 | 10/2009 | Scalisi et al. |
| 7,619,533 | B2 | 11/2009 | Crucilla |
| 7,728,724 | B1 | 6/2010 | Scalisi et al. |
| 7,848,761 | B2 | 12/2010 | Caspi |
| 7,877,104 | B2 | 1/2011 | Turetzky |
| 7,884,712 | B2 | 2/2011 | Nierenberg |
| 9,094,410 | B2 * | 7/2015 | Elliot ................ H04L 12/40013 |
| 2001/0048364 | A1 | 12/2001 | Kalthoff et al. |
| 2003/0021251 | A1 * | 1/2003 | Moshiri-Tafreshi et al. . 370/338 |
| 2003/0030561 | A1 | 2/2003 | Yafuso |
| 2003/0034894 | A1 | 2/2003 | Montagnino |
| 2003/0112141 | A1 | 6/2003 | Arunkumar |
| 2003/0210142 | A1 | 11/2003 | Freathy et al. |
| 2003/0227382 | A1 | 12/2003 | Breed |
| 2005/0068169 | A1 * | 3/2005 | Copley et al. ............ 340/539.13 |
| 2006/0109110 | A1 | 5/2006 | Hill |
| 2006/0266917 | A1 | 11/2006 | Sisinio |
| 2007/0129012 | A1 | 6/2007 | Snow |
| 2007/0185728 | A1 | 8/2007 | Schwarz |
| 2007/0276270 | A1 | 11/2007 | Tran |
| 2008/0001764 | A1 | 1/2008 | Douglas et al. |
| 2008/0055109 | A1 | 3/2008 | Freathy |

(56) References Cited

U.S. PATENT DOCUMENTS

| | | | |
|---|---|---|---|
| 2008/0085699 A1* | 4/2008 | Hirano et al. | 455/414.2 |
| 2008/0108370 A1 | 5/2008 | Aninye | |
| 2008/0278327 A1 | 11/2008 | Nierenberg | |
| 2009/0021398 A1 | 1/2009 | Thompson | |
| 2009/0143047 A1* | 6/2009 | Hays et al. | 455/404.2 |
| 2009/0251313 A1 | 10/2009 | Perkins | |
| 2011/0128148 A1 | 6/2011 | Nierenberg | |
| 2011/0171984 A1* | 7/2011 | Hosono et al. | 455/509 |
| 2011/0195707 A1* | 8/2011 | Faerber et al. | 455/423 |
| 2012/0235860 A1* | 9/2012 | Ghazarian | 342/357.4 |
| 2013/0189946 A1* | 7/2013 | Swanson | G08B 25/08 455/404.2 |

FOREIGN PATENT DOCUMENTS

| | | |
|---|---|---|
| EP | 0745867 | 12/1996 |
| EP | 1363258 | 11/2003 |
| EP | 1612755 | 7/2006 |
| GB | 2279170 | 12/1994 |
| GB | 2383666 | 7/2003 |
| GB | 2416094 | 1/2006 |
| WO | WO 88/09541 | 12/1988 |

OTHER PUBLICATIONS

U.S. Appl. No. 90/010,372, filed Dec. 26, 2008, Taylor.
Search Report issued in PCT/US2006/017541 on Jan. 31, 2007.
International Preliminary Report of Patentability issued in PCT/US06/017541.
Search Report issued in PCT/US2006/017678 on Sep. 8, 2006.
International Preliminary Report of Patentability issued in PCT/US06/017678, Nov. 8, 2007.
Murphy, John. "Advanced Electronic Monitoring for Tracking Persons on Probation or Parole," Feb. 29, 1996, pp. 1-34 and Appendix A.
Hoshen, Joseph. "Keeping Tabs on Criminals," IEEE, Spectrum, Feb. 1995, pp. 26-31.
Whitfield, Dick. "Tackling the Tag," Chapter 9, 1997, pp. 109-119.
Pro Tech Monitoring, Inc., SMART Systems Briefing, circa 1995-1996.
EBSCO Host, "'Spy' In the Sky," Onternational Construction, 00206415, Aug. 1997, vol. 36, issue 8.
Gable, Ralph. "Application of Personal Telemonitoring to Current Problems in Corrections," Journal of Criminal Justice, vol. 14, pp. 167-176 (1986).
Holland, James. Political Implications of Applying Behavioral Pschology, Mexico City, 1972.
Mainprize, Steve. "Elective Affinities in the Engineering of Social Control: The Evolution of Electronic Monitoring," ISSN: 1198 3655, Electronic Journal of Sociology (1996).
Le Marshall, Chris. "Single Geostatic Orbital Satellite in Tracking Ground-Based Mobile Radio Transmitter," National Air Intelligence Center, Oct. 11, 1995.
Montes, Marisela. "Technological Advances in Parole Supervision," Corrections Today, vol. 58, Issue 4, Jul. 1996.
Nieto, Marcus, "Community Correction Punishments: An Alternative TO Incarceration for Nonviolent Offenders," May 1996.
Schwitzgebel, Robert. "Psychotechnology Electronic Control of Mind and Behavior," Chapter 4, New York, 1973.
Reexamination Control No. 90/010,372, filed Dec. 26, 2008.
Wade, Andy. Book Review: *Tracking the Tag: The Electronic Monitoring of Offenders*, by Dick Whitfield, Probation Journal; 1997; 44; 234.
Harris County Invitation to Bid, Lease of Electronic Monitoring Equipment for the Harris County Community Supervision and Correction Department, circa 1994.
Electronic Monitoring: A listing of materials available at the Justice Institute Library, Oct. 6. 2006.
"Current Electronic Monitoring Market Place", circa 1995-1996.
Extended European Search Report issued in EP Appl 06759293.1 on Oct. 23, 2009.
Extended European Search Report issued in EP Appl 06740595.1 on Oct. 5, 2009.
European Search Report issued in EP Appl 10150064.3 on Mar. 12, 2010.
English Abstract of DE 19832671 published Jan. 27, 2000.
File History of U.S. Appl. No. 12/350,678.
File History of U.S. Appl. No. 11/935,833 (now U.S. Pat. No. 7,518,500).
File History of U.S. Appl. No. 11/935.858.
Notice of Allowance issued in EP Appl 06759293.1 on Dec. 7, 2010.
International Search Report and Written Opinion issued in PCT/US2011/023144 mailed Oct. 12, 2011.
http://www.indiamart.com/focuztechnologyenabledservices/remote-monitoring-system.html electronically captured on Feb. 22, 2012.
http://www.traccia.in/traccia/FleetManagement.aspx on Feb. 12. 2010 electronically captured using the Internet Archive Wayback Machine.
http://www.lockwoodtechnology.com/index/case-studies?id=6 on Oct. 31, 2012 electronically captured using the Internet Archive Wayback Machine.
Office Action issued in Canadian Application No. 2,607,236 dated Feb. 25, 2013.

* cited by examiner

MONITORING SYSTEMS AND METHODS

DETAILED DESCRIPTION OF SEVERAL EMBODIMENTS

Monitoring systems and methods which may be used to locate and/or monitor people, animals, vehicles, and/or other objects are described herein. These systems and methods may use a variety of computers, wearable and/or portable tracking devices, locator hubs, networks, and location technologies. Some examples of technologies which may be used for monitoring systems and methods may be found in U.S. Pat. No. 7,518,500, entitled "System and Method for Monitoring Alarms and Responding to the Movement of Individuals and Assets," the entirety of which is hereby incorporated by reference herein.

Computers may be linked to one another via a network or networks. A computer may be any programmable machine capable of performing arithmetic and/or logical operations. For example, wearable and/or portable locator devices, locator hubs, servers, and/or workstations may all be computers. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers. A network may be any plurality of completely or partially interconnected computers wherein some or all of the computers are able to communicate with one another. It will be understood by those of ordinary skill that connections between computers may be wired in some cases (i.e. via wired TCP connection or other wired connection) or may be wireless (i.e. via WiFi network connection). Any connection through which at least two computers may exchange data can be the basis of a network.

Figure 1:
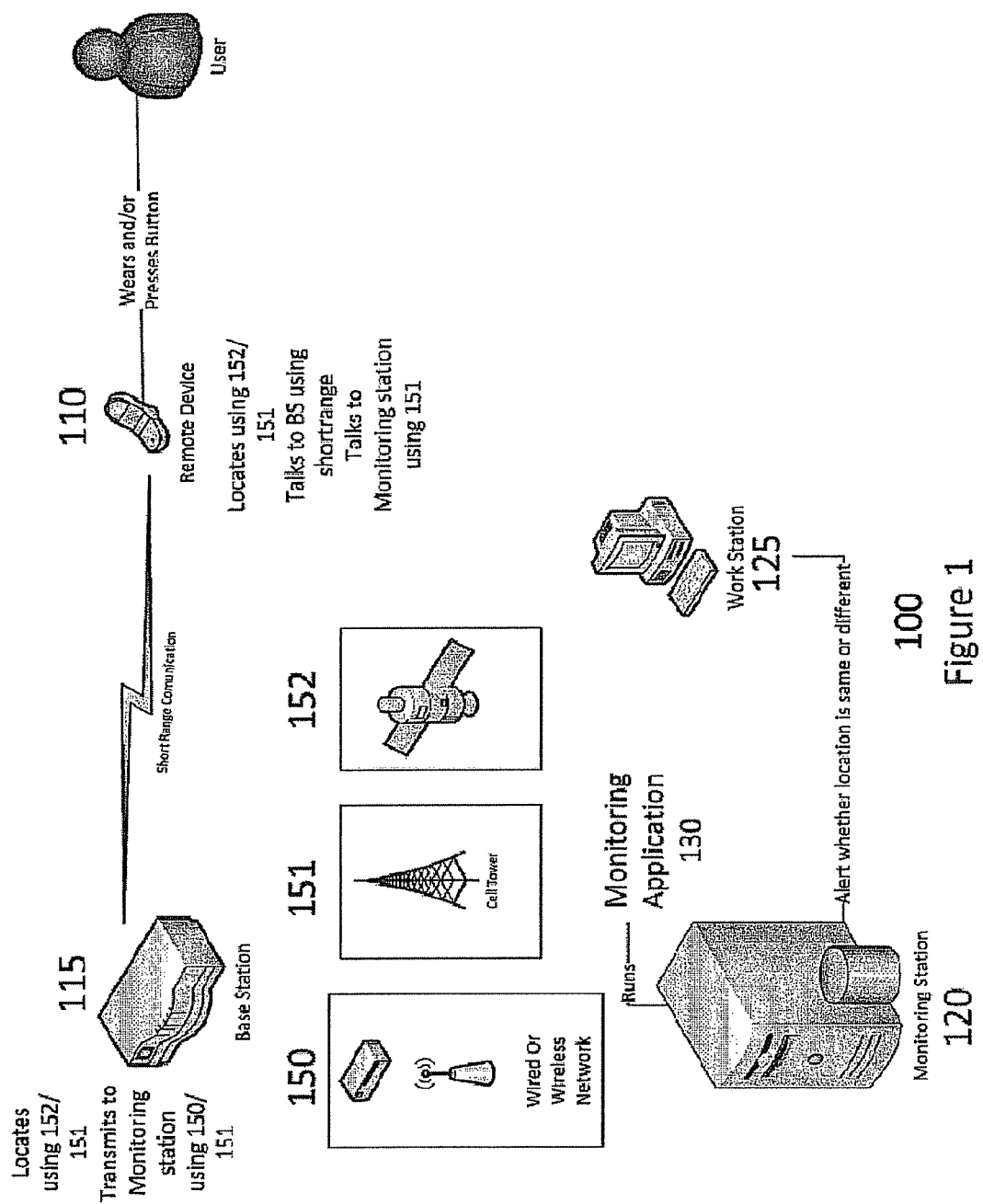
FIG. 1 depicts a monitoring system according to an embodiment of the invention.

FIG. 1 depicts a monitoring system 100 according to an embodiment of the invention. The monitoring system 100 may be used to monitor different things for different reasons in various embodiments. For example, in some embodiments, the monitoring system 100 may be used by an elderly or disabled person so they can be found in event of an urgent situation. In some embodiments, the monitoring system 100 may be used to track the whereabouts of a person, child, prisoner, pet, vehicle, or the like. In one embodiment, the monitoring may comprise: receiving, with a monitoring station, an alert from a base station, the alert not related to the location of the base station. The monitoring station may also receive a message comprising current location data for the base station. The current location data may be compared to pre-established location data. Based on the comparing, it may be determined whether the base station is located substantially at a pre-established location. One process associated with responding to the alert may be performed when the base station is located substantially at the pre-established location. An alternate process associated with responding to the alert may be performed when the base station is not located substantially at the pre-established location.

A user may carry or wear a remote device 110. For example, the remote device 110 may be a phone, bracelet, collar, or any other object able to be carried and/or worn. The remote device 110 may be capable of communicating using radio frequency technology, which may comprise short range communication technologies (e.g., WiFi, Zigbee, Bluetooth, digital enhanced cordless technology (DECT), etc.), and/or cellular communication technologies (e.g., code division multiple access (CDMA), global system for mobile (GSM) communications, long term evolution (LTE) technology, etc.), and/or other types of connection. In some embodiments, the remote device 110 may be able to generate an alert. For example, an elderly user may have a remote device 110 that is a wearable bracelet with a button. The elderly person may push this button if they become immobilized, ill, or otherwise placed in an urgent situation due to a medical or other emergency. Pushing the button may cause the remote device 110 to transmit an alert using a communication function such as an RF transmitter, as described above. Alerts may also be generated by other types of events associated with the remote device 110, such as: power loss in the remote device 110, a low and/or otherwise critical battery issue in the remote device 110 and/or base station 115; a power loss by the base station 115, supplying power to the base station 115 after a power loss by the base station 115, the base station 115 losing contact with a remote device 110 associated with the base station 115, the base station 115 receiving a message from the remote device 110 associated with the base station 115 (e.g., a button being pushed on the remote device 110, a condition being detected at the remote device 110 (e.g., alcohol levels, etc.), loss of cellular and/or landline communication for the base station 115, the base station 115 regaining cellular and/or landline communication after a communication loss, or any combination thereof. In some embodiments, the remote device 110 may be able to determine its own location through the use of a suitable technology (e.g., GPS, assisted GPS, advanced forward link trilateration (AFLT), etc.).

A base station 115 may be associated with one or more remote devices 110. The base station 115 may be a portable or stationary device that may be located at or near a location of interest to the user. For example, the base station 115 may be placed in the home of an elderly or disabled user, a prisoner, a child, or a pet being monitored. The base station 115 may be plugged into a power outlet and/or may have its own power supply such as a battery. The base station 115 may be able to communicate with the remote device 110 using a radio frequency, WiFi, cellular, and/or other type of connection. In some embodiments, the base station 115 may be able to receive an alert. The base station 115 may also be able to generate its own alerts in some cases. These alerts may be unrelated to the location of the base station 115, and may comprise: power loss in the remote device 110, a power loss by the base station 115, supplying power to the base station 115 after a power loss by the base station 115, the base station 115 losing contact with a remote device 110 associated with the base station 115, the base station 115 receiving a message from the remote device 110 associated with the base station 115 (e.g., a button being pushed on the remote device 110, a condition being detected at the remote device 110 (e.g., alcohol levels, etc.), loss of cellular and/or landline communication for the base station 115, the base station 115 regaining cellular and/or landline communication after a communication loss, or any combination thereof. In some embodiments, the base station 115 may be able to determine its own location through the use of GPS, cellular triangulation, and/or another suitable technology. For example, monitoring application 130 may determine the location of the base station 115 using the cellular strength of the cell towers that are in proximity. (Details on monitoring application 130 are set forth below with respect to FIG. 3.) In some embodiments, the base station 115 may also be able to determine the location of the remote device 110 by communicating with the remote device 110 and analyzing messages received from the remote device 110.

The base station 115 (and the remote device 110, in some embodiments) may be in communication with a network 150. The network 150 may comprise: a cellular network comprising cell towers 151 and/or other equipment, a satellite network comprising satellites 152 and/or other equipment, the Internet, or an Intranet, or any combination thereof. In some cases, elements of the network, such as cell towers 151 and/or satellites 152 (for example, GPS satellites) may provide location data to the base station 115 and/or remote device 110. The base station 115 and/or remote device 110 may use data from a cell tower 151 and/or satellite 152 to learn and/or determine their own locations. In some embodiments, a cell tower 151 and/or satellite 152 may learn and/or determine the location of a base station 115 and/or remote device 110, and may make this information available via the network 150. In some embodiments, the monitoring system 100 may only determine the location of the base station 115, and not a remote device 110 associated with the base station. Remote devices 110 and/or base stations 115 may be able to transmit alerts generated by the remote devices 110 via the network (or via other communication systems and methods).

A monitoring station 120 may be in communication with the network 150. One or more monitoring stations 120 may comprise one or more servers and/or other computers. Monitoring stations 120 may receive data about the locations of base stations 115 and/or remote devices 110 (which may be generated as described above) via the network. Monitoring stations 120 may also receive alerts from a base station 115 and/or remote device 110 via the network 150 or through some other communication channel. In embodiments wherein only the location of the base station 115 is known, alerts may be received from the base station 115 when a remote device 110 is within range of the base station 115 and/or the base station 115 itself generates the alert. In some embodiments, receiving an alert may cause the monitoring station 120 to perform an action, as will be described in greater detail below.

Monitoring stations 120 may be associated with one or more workstations 125. For example, a workstation 125 may be a computer that can allow a user to interact with the monitoring station 120 using a local network, the network 150, and/or some other communication systems and methods. A workstation 125 may allow a user to receive information about people and/or objects being monitored by the monitoring system 100, such as their locations and/or whether an alert has been generated by a remote device 110. Monitoring stations 120 may communicate with one or more base stations 115 and/or one or more remote devices 110.

Figure 3:
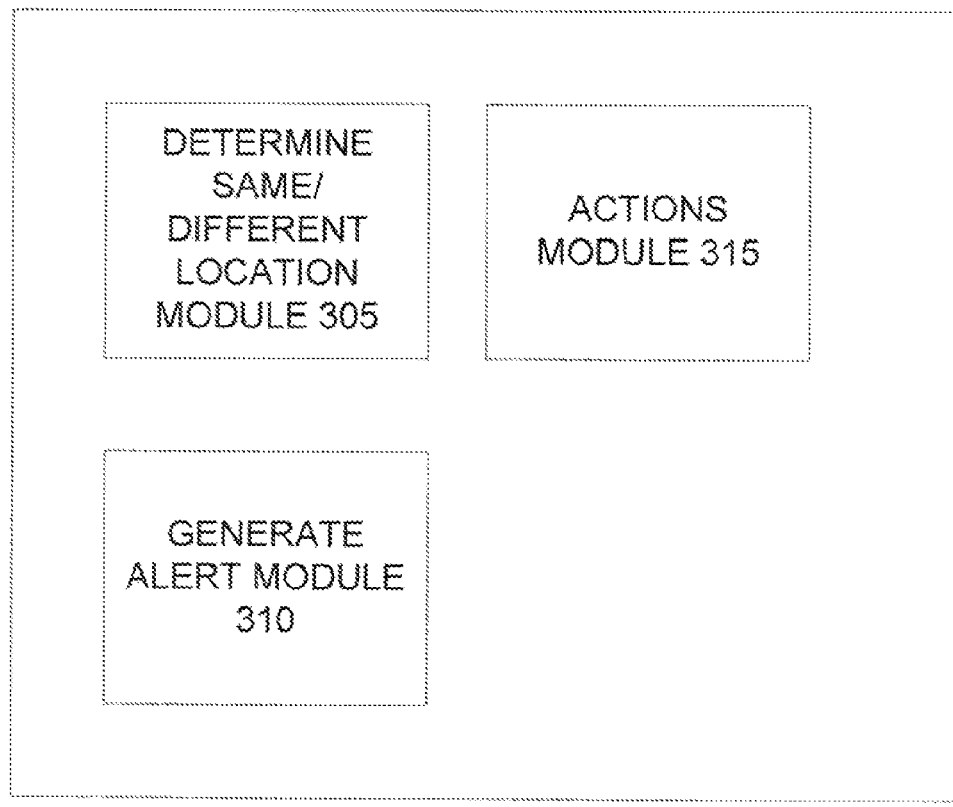
FIG. 3 depicts a monitoring application according to an embodiment of the invention.

FIG. 3 depicts details of monitoring application 130, according to an embodiment. Monitoring application 130 may comprise a determine same/different location module 305; a generate alert module 310; or an actions module 315, or any combination thereof. Using the available information from the base station 115 from when it first came into contact with the monitoring station 120, and/or some location set as a pre-established location, the determine same/different location module 305 may compare the location information (e.g., latitude/longitude or cellular location) for the base station 115 and determine whether the current location is the same as or different from the pre-established location. The generate alert module 310 may generate a same or different alert for work station 125. An alert of 'same location' may indicate the base station is in the same location as the previous event and/or pre-established location. An alert for 'different location' may indicate the base station had been moved since the previous event and/or pre-established condition. Depending on the alert from the base station 115, different actions may take place. For example, if the determine same/different locations module 305 determines that the locations of the base station 115 are the same (or substantially the same), a default alert response may be made. If the determine same/different locations module 305 determines that the locations of the base station 115 are different, an alternate alert response may be made. These responses are described in greater detail below. (It should be noted that different types of alerts are utilized, comprising: alerts from the base station 115 to the monitoring station 120; and/or alerts from the monitoring station 120 (e.g., generated by the generate alert module 310) to various subjects (e.g., caregivers, emergency service providers, the wearer of the remote device 110, other third parties of interest such as healthcare providers or fitness coaches, etc.).

In order to generate previous event data for a new base station 115, a first event may be a manual input of an address, latitude/longitude, or an initial event generated from the base station 115 such as plugging in for power, or communication with a cellular network 151 or satellite 152; or any combination thereof.

The actions module 315 may have a list of actions that can be taken for each user if a 'different location' alert is generated. Example actions may comprise: looking up contact information for emergency personnel located near the new location and informing them of the alert (instead of the default emergency personnel, if the default personnel and the nearby personnel are not the same); notifying listed contacts (e.g., relative, friend), starting a telephone conversation with the elderly person or someone else at the location through the remote device 110 or base station 115 to determine the new location; or any combination thereof. It should be noted that many other types of actions may be used. In addition, in some embodiments, a list of actions may be provided in a particular order for a particular user and the alternate action module 315 may do each action in the particular order until the new location of the base station 115 is determined. In other embodiment, the alternate action module 315 may trigger all actions simultaneously or near the same time.

Figure 2:
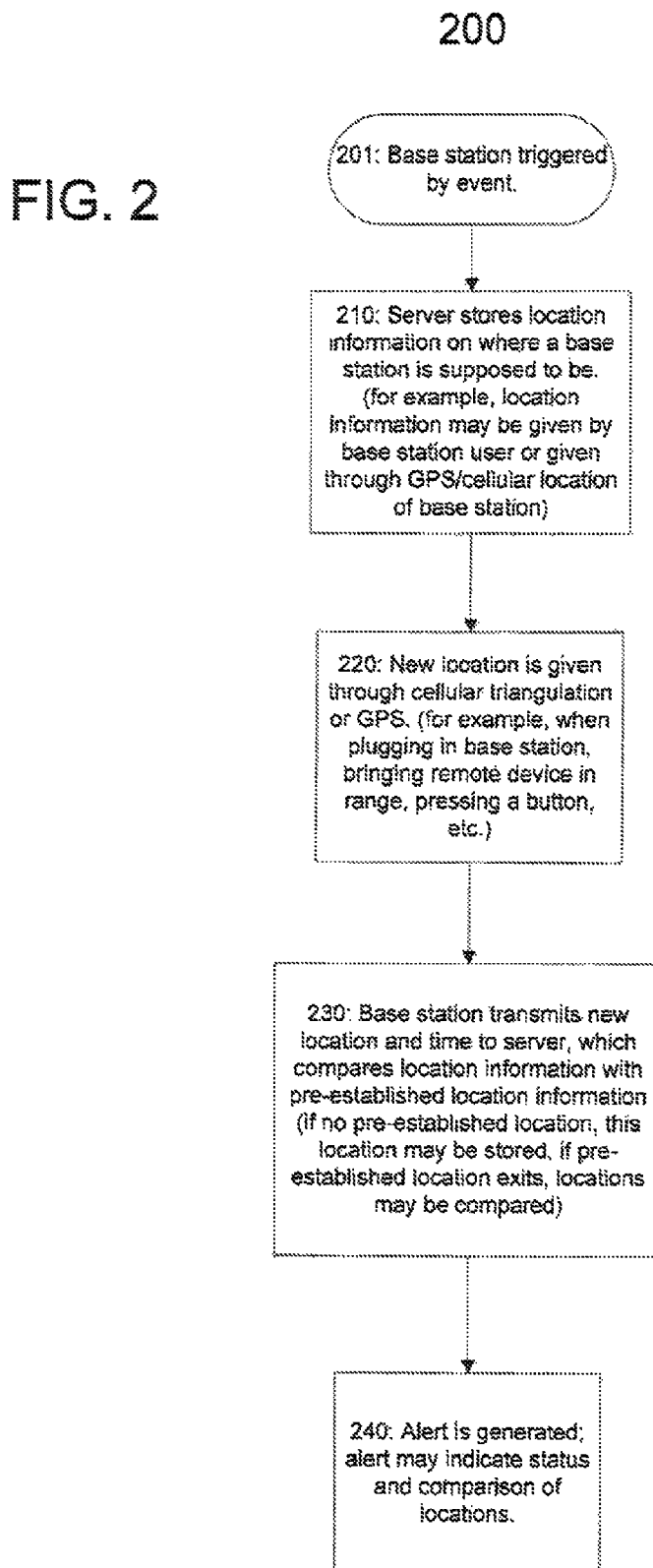
FIG. 2 depicts a location determination and alert response process according to an embodiment of the invention.

FIG. 2 depicts a location determination and alert response process 200 according to an embodiment of the invention. According to this example process 200 or some other process, a monitoring system 100 may determine that a location of a base station 115 has changed. In some embodiments, this change may cause the monitoring system 100 to behave differently than it would if the base station 115 had remained in its previous location.

As described above, a base station 115 or other network element may determine the location of a base station 115. This determination may be made when, in 201, the base station 115 is triggered by an event, such as an alert generated by: power loss in the remote device 110, a power loss by the base station 115, supplying power to the base station 115 after a power loss by the base station 115, the base station 115 losing contact with a remote device 110 associated with the base station 115, or the base station 115 receiving a message from the remote device 110 associated with the base station 115 (e.g., a button being pushed on the remote device 110, a condition being detected at the remote device 110 (e.g., alcohol levels, etc.), or any combination thereof. A base station 115 may have a default location. For example, when the base station 115 is first activated or installed, its location may be determined. The location may be determined by the monitoring system 100 locating the base station using GPS or some other system, or it may be determined by a user specifying a default location. In 210, this default location may be communicated to a monitoring station 120 and may be stored in an associated database.

In 220, the base station 115 may update its location using cellular triangulation, GPS, or some other suitable technology as described above. This may happen periodically and/or upon the occurrence of an event in some embodiments. Many events may be triggered by the remote device 110 as described above, for example when an elderly user requests assistance or when a pet crosses a boundary. Other types of events may also cause the base station 115 to update its location. For example, if the base station 115 is unplugged or otherwise loses power and/or the ability to communicate with the monitoring station 120, the location may be updated in 220 when the base station 115 regains power and/or the ability to communicate. The location may also be updated in 220 when a remote device 110 first comes into communication range of the base station 115 and/or returns to communication range after leaving. The base station 115 and/or remote device 110 may give a user the ability to cause the location to be updated in 220, for example, by pushing a button on the base station 115 or device 110 or through some other interface. Additionally, the base station 115 may provide location data to the monitoring station 120 when an alert is generated by the remote device 110. In this case, the base station 115 may communicate location data along with alert data.

When the base station 115 updates its location in 220, it may communicate the new location to the monitoring station 120. A transmission may include new location data, a time associated with the determination of the new location, and/or other data such as data indicating a type of alert that triggered the transmission (e.g., the wearer of the remote device 110 pushes a button or otherwise "calls" for help; it is determined that a condition is present for the wearer of the remote device 110). In 230, the monitoring station 120 may receive this information and compare it to the previously stored location data, which may be a default location or a previously updated location.

In some embodiments, after comparing locations 230, in 240, the monitoring station 120 may generate an alert. The alert may comprise information such as remote device 110 status, base station status 115 (which may include a location, time, and/or other data), or comparison data (e.g., date regarding whether the base station is in the same place or a different place); or any combination thereof. This alert may be communicated to a workstation 125 or other user interface and/or may be stored in a database associated with the monitoring station 120.

Because the monitoring system 100 may be able to determine whether a base station 115 location has changed, the monitoring system 100 may be able to behave differently depending on the location of the base station 115. For example, a default location for a base station 115 may be the home of an elderly user. While the elderly user is carrying or wearing a remote device 110 within range of the base station 115 (for example, is at home or near home), the base station 115 may be able to receive messages such as alerts from the remote device 110. If the elderly user falls and presses a button on the remote device 110, an alert may be generated and sent from the remote device 110 to the base station 115. The base station 115 may communicate the alert and/or data related to the alert to the monitoring station 120. In response to receiving the alert data, the monitoring station 120 may be configured to initiate automatic response processes and/or communicate the alert data to a workstation 125 or other user interface to enable manual response processes. For example, the monitoring station 120 may automatically inform emergency personnel about the alert, and the emergency personnel may respond to the emergency. A workstation 125 user may alternatively or additionally be able to inform emergency personnel about the alert and/or take action themselves.

The monitoring station 120 may have a default course of action associated with the default location for the base station 115. For example, the default course of action may be an automated routine and/or instructions or data for display to a user via a workstation 125 or other interface. When a base station 115 communicates alert data to the monitoring station 120, the base station 115 may also communicate location data, as described above. The monitoring station 120 may compare the communicated location data to stored data, as described above. If it is determined that the base station 115 is at or substantially near the default location, the monitoring station 120 may take a default course of action. For example, the default course of action may cause the monitoring station 120 to automatically inform emergency personnel and/or a nearby caregiver (e.g., neighbor, relative) who may be stationed near the default location.

When alert data and location data indicate that the base station 115 is not at or substantially near the default location, the monitoring station 120 may take an alternate course of action. In some embodiments, the monitoring station 120 or a user (such as a workstation 125 user) may take one or more of a plurality of alternate courses of action. For example, the elderly user may relocate the base station 115 to a vacation home, relative's home, workplace, or some other location where they expect to be for some time. When an alert is generated, the base station 115 may communicate the alert data and the new location data to the monitoring station 120. Through the comparison and analysis described above, the monitoring station 120 may determine that the base station 115 (and therefore the remote device 110 carried by the elderly user) is at a location different from the default location. An example alternate course of action may involve looking up contact information for emergency personnel located near the new location and informing them of the alert (instead of the default emergency personnel, if the default personnel and the nearby personnel are not the same) or simply starting a telephone conversation with the elderly person or someone else at the location through the remote device 110 or base station 115 to determine location. This alternate course of action may be performed automatically using the actions module 315 of the monitoring application 130 and the monitoring station 120 and/or manually by a user of a workstation 125 or other interface accessing the information in the actions module 315.

Various examples of embodiments of the invention are set forth below. Note that, while the examples discuss primary and secondary location information, most recent and previous location information may also be utilized, so that the most recent location information may be compared to the previous location information to determine if the base station 115 has recently moved.

A person (caregiver) may have a remote device 110 that is attached to a pet (e.g., on a collar) or on a child or other person (e.g., by a wrist, lanyard, pocket or shoe worn device). That remote device 110 may be in communication with a base station 115. A baseline location for the base station 115 may be established by inputting a location for the base station 115 which may be stored in the determine same/different location module 305, using, for example, a website that allows for input of address information. In other embodiments, longitude/latitude information may be sent to the determine same/different location module 305. In other embodiments, when the base station 115 is plugged in, the base station may determine its location through: cellular communication 151; by satellite 152; or the monitoring station 120 may communicates with the cell towers 151 to determine the location of the base station 115; or any combination thereof. This information may then be provided to the determine same/different location module 305 as a primary data point location. Then, if an alert is generated by the base station 115 (e.g., power loss in the remote device 110, a power loss by the base station 115, supplying power to the base station 115 after a power loss by the base station 115, the base station 115 losing contact with a remote device 110 associated with the base station 115, or the base station 115 receiving a message from the remote device 110 associated with the base station 115 (e.g., a button being pushed on the remote device 110, a condition being detected at the remote device 110 (e.g., alcohol levels, etc. through buttons or sensors (e.g., an accelerometer or microphone), or any combination thereof), then a secondary data point for location may be provided to the determine same/different location module 305. A comparison of whether the secondary data point location is the same or different as the primary data point location may be made. Depending on whether the secondary data point location is the same or different from the primary data point location, different paths of behavior may be generated. For example, if the location is the same, then the actions module 315 may communicate to the generate alert module 310 that an alert is to be sent to the caregiver contact and the emergency services contact as to the status of the pet or person associated with the base station 115. The alert may include information related to the primary and secondary locations being a match. If the primary and secondary locations do not match, then the actions module 315 may communicate to the generate alert module 310 that an alert is to be generated for the caregiver contact and the emergency services contact. This alert may include information that there is no match and further data is needed for intervention (e.g., a phone call, sending someone to investigate). Alerts such as those generated in this example or in any other embodiment may be in any form, such as email, text, or call alerts.

As another example, if a criminal under house arrest has a remote device 110 (e.g., a phone or GPS ankle bracelet) that is associated with a base station 115, then a person (e.g., law enforcement official, contract person) with a capacity to monitor the criminal may create a primary location for the base station 115 by entering an address, or latitude/longitude information into a work station 125 connected to a monitoring station 120, which information is accessible to the determine same/different location module 305 of the monitoring application 130. In addition, the base station 115 may create the primary location information using satellite 152 or cellular communication 151; or the monitoring station 120 may create the primary location information through communication with the cellular communication 151. As indicated earlier, this primary location may be stored on the monitoring station 120 and accessed by the determine same/different location module 305. If an alert is generated by the base station 115 (e.g., power loss in the remote device 110, a power loss by the base station 115, supplying power to the base station 115 after a power loss by the base station 115, the base station 115 losing contact with a remote device 110 associated with the base station 115, or the base station 115 receiving a message from the remote device 110 associated with the base station 115 (e.g., a button being pushed on the remote device 110, a condition being detected at the remote device 110 (e.g., alcohol levels, etc. through buttons or sensors (e.g., an accelerometer or microphone), or any combination thereof)) then a secondary location may be generated. If the secondary location is determined to be the same as the primary location, then the actions module 315 may mandate no actions or a certain workflow of actions. For example, the actions module 315 may mandate that if the locations are the same, no alert is to be generated by the generate alerts module 310 related to the location of the base station 115. If the location are determined to be different, then the actions module 315 may indicate that certain contacts (e.g., a law enforcement official with access to a work station 125 connected to a monitoring station 120) are to receive an alert generated by the generate alert module 310 that the base station 115 appears to have been moved.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described embodiments In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the teens "a", "an", "the", "said", etc. also signify "at least one" or "the at least one" in the specification, claims and drawings. In addition, the term "comprises" signifies "including, but not limited to" in the specification, claims and drawings.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. A method of operating a monitoring system comprising:
performing processing associated with receiving, with a monitoring station, an alert from a base station, the alert not related to location of the base station;
performing processing associated with receiving, with the monitoring station, a message comprising current location data for the base station;
performing processing associated with comparing the current location data to pre-established location data for the base station;
performing processing associated with determining whether the base station is located substantially at a pre-established location based on the comparing;
performing processing associated with responding to the alert using one process when the base station is located substantially at the pre-established location; and performing processing associated with responding to the alert using an alternate process when the base station is not located substantially at the pre-established location, wherein a remote device is associated with the base station, wherein the remote device comprises a GPS ankle bracelet for monitoring a first person, wherein the remote device is operable to determine location using GPS technology, wherein the alert is generated by the base station in response to the remote device having a low battery issue, wherein the pre-established location data for the base station defines a primary location for the base station that the monitoring station receives via a network from a workstation of a second person with a capacity to monitor the first person, wherein the alternate process comprises sending a notification to the workstation via the network for receipt by the second person, the notification notifying that the base station appears to have been moved from the primary location to a remote location based on comparing first location information for the base station to second location information for the base station, wherein the one process comprises not sending the notification notifying that the base station appears to have been moved, and wherein the method further comprises:
  for each user in a plurality of users, taking user-specific actions if a second alert is generated that indicates a base station movement;
  maintaining a list of actions provided in a particular order for a particular user; and
  doing each action in the list of actions in the particular order until a new location of the base station is determined.

2. The method of claim 1, further comprising:
receiving with the monitoring station an emergency message comprising a notification that the remote device associated with the base station has been activated; and/or
sending a notification comprising location data for the pre-established location.

3. The method of claim 1, wherein the alternate process comprises transmitting an alternate alert to an alternate receiver, the alternate alert comprising location data for the current location.

4. The method of claim 1, wherein the alternate process comprises transmitting a message.

5. The method of claim 4, wherein the message comprises: an email message; a text message; a voice message; or a fax message; or any combination thereof.

6. The method of claim 1, wherein the remote device is wearable.

7. The method of claim 1, wherein the remote device comprises a cellular phone.

8. The method of claim 1, further comprising performing processing associated with storing the current location data in a memory.

9. The method of claim 1, wherein the pre-established location data comprises previously received location data for the base station.

10. The method of claim 1, wherein the message is received via a cellular network.

11. The method of claim 1, wherein the message is received via the Internet.

12. The method of claim 1, wherein the current location data comprises GPS data and/or cellular triangulation data.

13. The method of claim 1, wherein the pre-established location data comprises GPS data and/or cellular triangulation data.

14. The method of claim 1, wherein the monitoring system comprises a house arrest monitoring system.

15. The method of claim 1, wherein comparing first location information for the base station to second location information for the base station comprises the monitoring station communicating with cell towers to determine the first location for the base station with the second location for the base station.

16. The method of claim 1, wherein comparing first location information for the base station to second location information for the base station comprises the base station determining location through cellular communication.

17. The method of claim 1, wherein comparing first location information for the base station to second location information for the base station comprises the base station determining location by satellite.

18. A monitoring system comprising:
  a monitoring station constructed and arranged to:
    receive an alert from a base station, the alert not related to location of the base station;
    perform processing associated with receiving a message comprising current location data for the base station;
    perform processing associated with comparing the current location data to pre-established location data for the base station;
    perform processing associated with determining whether the base station is located substantially at a pre-established location based on the comparing;
    perform processing associated with responding to the alert using one process when the base station is located substantially at the pre-established location; and
    perform processing associated with responding to the alert using an alternate process when the base station is not located substantially at the pre-established location, wherein a remote device is associated with the base station, wherein the remote device comprises a GPS ankle bracelet for monitoring a first person, wherein the remote device is operable to determine location using GPS technology, wherein the alert is generated by the base station in response to the remote device having a low battery issue, wherein the pre-established location data for the base station defines a primary location for the base station that the monitoring station receives via a network from a workstation of a second person with a capacity to monitor the first person, wherein the alternate process comprises sending a notification to the workstation via the network for receipt by the second person, the notification notifying that the base station appears to have been moved from the primary location to a remote location based on comparing first location information for the base station to second location information for the base station, wherein the one process comprises not sending the notification notifying that the base station appears to have been moved, and wherein the monitoring station is further constructed and arranged to:
  maintain user-specific lists of actions that have respective user-specific orders; and
  in response to determining that the base station has moved, perform each action in one of the user-specific lists of actions in the respective user-specific order until a new location of the base station is determined.

19. The monitoring system of claim 18, wherein the monitoring station is further constructed and arranged to:
receive an emergency message comprising a notification that the remote device associated with the base station has been activated; and/or
send another alert comprising location data for the pre-established location.

20. The monitoring system of claim 19, wherein the alternate process comprises transmitting an alternate alert to an alternate receiver, the alternate alert comprising location data for the current location.

21. The monitoring system of claim 20, wherein transmitting the alternate alert comprises transmitting a message.

22. The monitoring system of claim 21, the message comprising: an email message; a text message; a voice message; or a fax message; or any combination thereof.

23. The monitoring system of claim 19, wherein the remote device is wearable.

24. The monitoring system of claim 19, wherein the remote device comprises a cellular phone.

25. The monitoring system of claim 18, wherein:
the monitoring station comprises a memory; and
the monitoring station is further constructed and arranged to store the current location data in the memory.

26. The monitoring system of claim 18, wherein the pre-established location data comprises previously received location data for the base station.

27. The monitoring system of claim 18, wherein:
the monitoring station is further constructed and arranged to communicate with a cellular network; and
the message is received via the cellular network.

28. The monitoring system of claim 18, wherein:
the monitoring station is further constructed and arranged to communicate with the Internet; and
the message is received via the Internet.

29. The monitoring system of claim 18, wherein the current location data comprises GPS data and/or cellular triangulation data.

30. The monitoring system of claim 18, wherein the pre-established location data comprises GPS data and/or cellular triangulation data.

31. The monitoring system of claim 18, wherein the monitoring system comprises a house arrest monitoring system.

32. The monitoring system of claim 18, wherein comparing first location information for the base station to second location information for the base station comprises the monitoring station communicating with cell towers to determine the first location for the base station with the second location for the base station.

33. The monitoring system of claim 18, wherein comparing first location information for the base station to second location information for the base station comprises the base station determining location through cellular communication.

34. The monitoring system of claim 18, wherein comparing first location information for the base station to second location information for the base station comprises the base station determining location by satellite.

* * * * *